(12) United States Patent
McBeath et al.

(10) Patent No.: US 9,001,745 B2
(45) Date of Patent: Apr. 7, 2015

(54) HARQ PROCESS NUMBER MANAGEMENT FOR DOWNLINK CARRIER

(75) Inventors: Sean McBeath, Irving, TX (US); Zhijun Cai, Irving, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 614 days.

(21) Appl. No.: 12/723,181

(22) Filed: Mar. 12, 2010

(65) Prior Publication Data

US 2010/0254327 A1 Oct. 7, 2010

Related U.S. Application Data

(60) Provisional application No. 61/160,070, filed on Mar. 13, 2009.

(51) Int. Cl.
*H04W 4/00* (2009.01)
*H04L 1/18* (2006.01)

(52) U.S. Cl.
CPC .................. *H04L 1/1812* (2013.01)

(58) Field of Classification Search
USPC ......... 370/203, 204–215, 229–253, 310–337, 370/395.3, 395.4, 395.41, 395.42, 395.5, 370/395.52, 431–529, 523–520
See application file for complete search history.

(56) References Cited

U.S. PATENT DOCUMENTS

| | | | |
|---|---|---|---|
| 7,733,827 B2 * | 6/2010 | Kim et al. | 370/328 |
| 7,774,686 B2 * | 8/2010 | Ahn et al. | 714/776 |
| 7,940,795 B2 * | 5/2011 | Frederiksen et al. | 370/468 |
| 7,957,329 B2 * | 6/2011 | Ahn et al. | 370/280 |
| 8,023,990 B2 * | 9/2011 | Parkvall | 455/522 |
| 8,054,767 B2 * | 11/2011 | Choi et al. | 370/280 |
| 2009/0180435 A1 * | 7/2009 | Sarkar | 370/330 |
| 2009/0268693 A1 * | 10/2009 | Lindh et al. | 370/336 |
| 2009/0300456 A1 * | 12/2009 | Pelletier et al. | 714/749 |
| 2009/0316758 A1 * | 12/2009 | Ahn et al. | 375/135 |
| 2010/0080187 A1 * | 4/2010 | Papasakellariou et al. | 370/329 |
| 2010/0157916 A1 * | 6/2010 | Kim et al. | 370/329 |
| 2010/0172308 A1 * | 7/2010 | Nam et al. | 370/329 |
| 2010/0208629 A1 * | 8/2010 | Ahn et al. | 370/280 |
| 2010/0227569 A1 * | 9/2010 | Bala et al. | 455/73 |
| 2010/0232488 A1 * | 9/2010 | Song et al. | 375/224 |

(Continued)

FOREIGN PATENT DOCUMENTS

EP 1936853 A1 6/2008

OTHER PUBLICATIONS

PCT application No. PCT/US2010/027151, International Search Report mailed May 8, 2010.

(Continued)

*Primary Examiner* — Jung-Jen Liu
(74) *Attorney, Agent, or Firm* — Fish & Richardson P.C.

(57) ABSTRACT

A method and apparatus wherein the method comprises maintaining at least first and second Hybrid Automatic Repeat reQuest (HARQ) Process Groups (HPGs), receiving a downlink control information (DCI) message, using at least one of explicit information and implicit information associated with the DCI message to identify one of the HPGs, using at least one of explicit information and implicit information associated with the DCI message to identify a first carrier and generating a transmission of at least one data packet using the identified HPG to an access device via the carrier and a first uplink sub-frame.

18 Claims, 12 Drawing Sheets

(56) References Cited

U.S. PATENT DOCUMENTS

| | | | |
|---|---|---|---|
| 2011/0182245 A1* | 7/2011 | Malkamaki et al. | 370/329 |
| 2011/0194501 A1* | 8/2011 | Chung et al. | 370/328 |
| 2011/0211489 A1* | 9/2011 | Chung et al. | 370/252 |
| 2011/0211522 A1* | 9/2011 | Chung et al. | 370/315 |
| 2011/0223927 A1* | 9/2011 | Seo et al. | 455/450 |
| 2011/0274066 A1* | 11/2011 | Tee et al. | 370/329 |

OTHER PUBLICATIONS

Qualcomm Europe: "Multicarrier Control for LTE-Advanced" 3GPP Draft; R1-090359, 3rd Generation Partnership Project (3GPP), Mobile Competence Centre; 650, Route Des Lucioles; F-06921 Sophia-Antipolis Cedex; France, no. Ljubljana; 20090108, Jan. 8, 2009, XP050318265 (retrieved on Jan. 8, 2009).

Qualcomm Europe: "Multicarrier Control for LTE-Advanced" 3GPP Draft; R1-090862, 3rd Generation Partnership Project (3GPP), Mobile Competence Centre; 650, Route Des Lucioles; F-06921 Sophia-Antipolis Cedex; France, no. Athens, Greece; 20090203, Feb. 3, 2009, XP050318712 (retrieved on Feb. 3, 2009).

Qualcomm Europe: "UL HARQ Feedback for Multicarrier Operation" 3GPP Draft; R1-094208 UL ACK for MC, 3rd Generation Partnership Project (3GPP), Mobile Competence Centre; 650, Route Des Lucioles; F-06921 Sophia-Antipolis Cedex; France, no. Miyazaki 20091012, Jan. 8, 2009, XP050388678 (retrieved on Oct. 6, 2009).

* cited by examiner

HARQ PROCESS NUMBER MANAGEMENT FOR DOWNLINK CARRIER

CROSS-REFERENCE TO RELATED APPLICATIONS

This application is based on U.S. Provisional Patent Application Ser. No. 61/160,070 filed on Mar. 13, 2009 and entitled "HARQ PROCESS MANAGEMENT FOR UPLINK CARRIER AGGREGATION."

BACKGROUND

The present invention relates generally to data transmission in mobile communication systems and more specifically to methods for managing HARQ process numbers for downlink carrier aggregation.

As used herein, the terms "user agent" and "UA" can refer to wireless devices such as mobile telephones, personal digital assistants, handheld or laptop computers, and similar devices that have telecommunications capabilities. In some embodiments, a UA may refer to a mobile, wireless device. The term "UA" may also refer to devices that have similar capabilities but are not transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). additional characteristics to LTE systems/equipment will eventually result in an LTE advanced (LTE-A) system. As used herein, the term "access device" will refer to any component, such as a traditional base station or an LTE or LTE-A access device, that can provide a UA with access to other components in a telecommunications system.

In mobile communication systems such as the enhanced universal terrestrial radio access network (E-UTRAN), an access device provides radio access to one or more UAs. To facilitate radio access, the access device and UA establish several communication channels including, among others, a Physical Down link Control CHannel (PDCCH), a Physical Downlink Shared CHannel (PDSCH), Physical Uplink Shared CHannel (PUSCH) and a Physical Hybrid automatic repeat request Indicator CHannel (PHICH). The access device comprises a packet scheduler for dynamically scheduling downlink traffic data packet transmissions and allocating uplink traffic data packet transmission resources among all the UAs communicating to the access device. The functions of the scheduler include, among others, dividing the available air interface capacity between UAs, deciding the transport channel to be used for each UA's packet data transmissions, and monitoring packet allocation and system load. The scheduler dynamically allocates resources for PDSCH and PUSCH data transmissions, and sends scheduling information to the UAs via the PDCCH.

Several different data control information (DCI) message formats are used by LTE access devices to communicate data packet resource assignments to UAs via the PDCCH. For uplink resource grants, a DCI format 0 is employed which includes, among other information, a new data indicator (NDI) which, as the label implies, indicates if the resource grant is for new data or data that is to be retransmitted. Other DCI formats are used to schedule downlink transmissions. UAs refer to the scheduling/resource allocation information for the timing and the data rate of uplink and downlink transmissions and transmit or receive data packets accordingly.

Hybrid Automatic Repeat reQuest (HARQ) is a scheme for re-transmitting a traffic data packet to compensate for an incorrectly received traffic packet. A HARQ scheme is used both in uplink and downlink in LTE systems. In the case of uplink transmissions, for each uplink packet received, the PHICH after a cyclic redundancy check (CRC) performed by the access device indicates a successful decoding. If the CRC indicates a packet is not received correctly, the access device transmits a negative acknowledgement (NACK) in order to request a retransmission of the erroneously received packet.

In addition to monitoring the PHICH for an ACK/NACK, in the case of an uplink transmission, the UA monitors the PDCCH for a DCI message including information indicating whether or not a packet retransmission (i.e., that a packet was incorrectly received) or a new transmission (i.e., that a packet was correctly received) should occur and for a resource grant for a new transmission or a re-transmission. Where a data packet has to be retransmitted, if radio conditions have changed, an access device may identify a more optimal resource for packet retransmission and transmit a new DCI message indicating the new grant to a UA. The process of changing a resource grant for retransmission is referred to generally as adaptive retransmission. If a new resource grant is not received for retransmission, the UA simply uses the previously granted resource to retransmit.

LTE uplink transmissions are divided into eight separate 1 millisecond sub-frames. DCI messages and ACK/NACK messages are synchronized with uplink sub-frames so that they can be associated therewith implicitly as opposed to explicitly, which reduces control and HARQ overhead requirements. For instance, in LTE systems, a DCI message is associated with a sub-frame four milliseconds later so that, for example, when a DCI message is received at a first time, the UA is programmed to use the resource grant indicated therein to transmit a data packet in the sub-frame four milliseconds after the first time. As another instance, in an LTE system an ACK/NACK is associated with a sub-frame four milliseconds prior so that, for example, when an ACK/NACK is received at a first time, the UA is programmed to associate the ACK/NACK with the data packet transmitted in the sub-frame four milliseconds prior to the first time.

In many cases it is desirable for an access device to transmit a large amount of data to a UA in a short amount of time. For instance, a series of pictures may have to be transmitted to an access device over a short amount of time. As another instance, a UA may run several applications that all have to transmit data packets to an access device essentially simultaneously so that the combined data transfer is extremely large.

In the case of uplink transmissions, a separate HARQ process is maintained for each uplink sub-frame used. In the case of LTE, the access device maintains a HARQ process buffer for each of the eight uplink sub-frames and packets are retransmitted by a UA in the same sub-frame as an original packet transmission. After a packet is correctly received by an access device, a new packet uplink transmission is initiated by the access device transmitting a DCI message including an NDI to the UA. Between NDIs, the access device combines transmissions occurring in the same sub-frame. Thus, an access device can associate retransmitted packets with prior transmitted packets by simply using sub-frame numbers.

One way to increase the rate of data transmission is to use multiple carriers (i.e., multiple frequencies) to communicate between an access device and UAs. For example, a system may support five different carriers (i.e. frequencies) and eight sub-frames so that five separate eight sub-frame uplink transmission streams can be generated in parallel. In multi-carrier systems, a separate HARQ process is maintained for each sub-frame/carrier combination. For instance, in a five carrier system with eight sub-frame communications, forty different HARQ processes are maintained.

While adaptive retransmission in a single carrier system can be supported by current DCI message formats, unfortunately, in multi-carrier systems where a UA transmits packets using multiple carriers in a single sub-frame (e.g., first and second carriers may be used to simultaneously transmit first and second separate packets in sub-frame 7), currently there is no way for an access device to control UA cross carrier adaptive retransmission. For example, where first and second carriers are simultaneously used to transmit different first and second packets in sub-frame 7 to an access device and it would be optimal to retransmit the first packet using a fourth carrier, there is no way, using current DCI messaging formats, to distinguish the seventh sub-frame associated with the first carrier from the seventh sub-frame associated with the second carrier.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
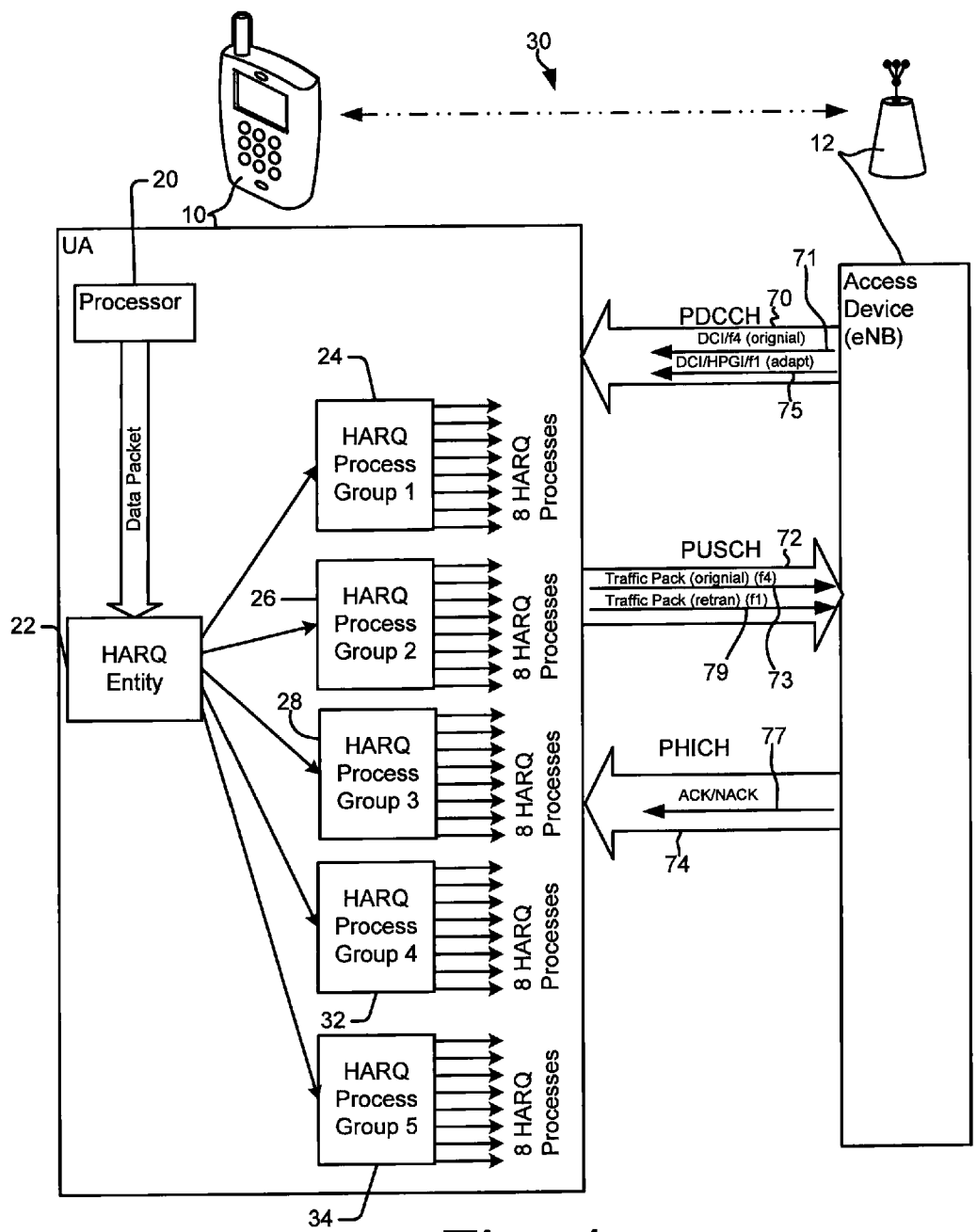
FIG. 1 is a schematic diagram showing components of a communication system including a user agent that includes a (HARQ) entity that maintains a plurality of HARQ process groups for managing adaptive retransmissions in multi-carrier systems.

It has been recognized that a UA may maintain a plurality of different HARQ process groups (HPGs) where each of the process groups handles a subset of uplink transmissions. A new uplink DCI format 0 is contemplated where DCI messages can either implicitly or explicitly indicate one of the HARQ process groups, a sub-frame and a new carrier for retransmissions. To this end, each HARQ process group is uniquely identifiable by a HARQ Process Group Indicator (HPGI) and the new DCI format 0 includes an HPGI field that can uniquely identify one of the HARQ process groups. Information implicit in DCI message timing can be used to identify a sub-frame. Information either implicit or explicit in the DCI message may indicate a new carrier for HARQ retransmission.

In some embodiments it is contemplated that each HARQ process group may be indexed to a specific one of the carriers so that, at least initially, the standard DCI format 0 could be used for indicating initial resource grant. Here, an initial HARQ process group and initial carrier would be implicit in the DCI message carrier. Thereafter, when a new carrier is required for packet retransmission, the new carrier could be indicated by a subsequent DCI message delivered via the new carrier where an HPGI field indicates the process group associated with the initial carrier.

In other embodiments, the HPGI field in the DCI format 0 may be replaced by an adaptive carrier field. In this case, a UA HARQ entity may be programmed to identify a DCI message carrier frequency as the frequency most previously or originally used to transmit a data packet via the sub-frame associated with the DCI message and to identify a carrier specified in the adaptive carrier field as a new or adaptive carrier to be used to retransmit the data packet via the sub-frame. In the alternative, the HPGI field may be replaced by a previous carrier or original carrier field and the DCI message carrier may be used to identify an adaptive carrier for a sub-frame associated with the DCI message.

In at least some cases the invention includes a method comprising the steps of maintaining at least first and second Hybrid Automatic Repeat reQuest (HARQ) Process Groups (HPGs), receiving a downlink control information (DCI) message, using at least one of explicit information and implicit information associated with the DCI message to identify one of the HPGs, using at least one of explicit information and implicit information associated with the DCI message to identify a first carrier and generating a transmission of at least one data packet using the identified HPG to an access device via the carrier and a first uplink sub-frame.

In some embodiments the DCI message includes explicit information indicating an HPG and wherein the step of using at least one of explicit information and implicit information associated with the DCI message to identify one of the HPGs includes using the explicit information indicating an HPG. In some cases the DCI message is received via a carrier and wherein the step of using at least one of explicit information and implicit information associated with the DCI message to identify a first carrier includes identifying the DCI message carrier as the first carrier.

In some embodiments the DCI message includes explicit information indicating a first carrier and wherein the step of using at least one of explicit information and implicit information associated with the DCI message to identify a first carrier includes identifying the carrier explicitly indicated in the DCI message. In some cases, prior to receiving the DCI message, the first uplink sub-frame was used by the HPG to transmit the data packet to an access device via a second carrier different from the first carrier. In some embodiments each of the HPGs is indexed to a different carrier and wherein the step of identifying one of the HPGs includes identifying the HPG indexed to the DCI message carrier.

In some embodiments the DCI message includes an HPG Index (HPGI) field, an HPGI is included in the HPGI field that explicitly indicates the HPG and wherein the step of using at least one of explicit and implicit information associated with the DCI message to identify one of the HPGs includes using the HPGI to identify one of the HPGs. In some cases the HPGs are indexed to specific carriers, the DCI message is received via a carrier and wherein the step of using at least one of explicit information and implicit information associated with the DCI message to identify one of the HPGs includes using the DCI message carrier to identify an HPG.

In some embodiments the DCI message includes explicit information indicating a carrier and wherein the step of using at least one of explicit information and implicit information associated with the DCI message to identify a first carrier includes identifying the carrier explicitly indicated in the DCI message.

Other embodiments include a method comprising transmitting a data packet via a uplink sub-frame and a first carrier to an access device, receiving a DCI message transmitted from an access device that is associated with the uplink sub-frame and the first carrier and that one of implicitly and explicitly indicates a second carrier and retransmitting the data packet via the uplink sub-frame and the second carrier to the access device.

Still other embodiments include a user agent for use in a wireless communication system comprising a processor programmed to perform the steps of maintaining at least first and second Hybrid Automatic Repeat reQuest (HARQ) Process Groups (HPGs), receiving a downlink control information (DCI) message from an access device, using at least one of explicit information and implicit information associated with the DCI message to identify one of the HPGs, using at least one of explicit information and implicit information associated with the DCI message to identify a first carrier, generating a transmission of at least one data packet using the identified HPG to an access device via the carrier and a first uplink sub-frame.

In some embodiments the DCI message includes explicit information indicating an HPG and wherein the step of using at least one of explicit information and implicit information associated with the DCI message to identify one of the HPGs includes using the explicit information indicating an HPG. In some embodiments the DCI message is received via a carrier and wherein the step of using at least one of explicit information and implicit information associated with the DCI message to identify a first carrier includes identifying the DCI message carrier as the first carrier.

In some embodiments the DCI message includes explicit information indicating a first carrier and wherein the step of using at least one of explicit information and implicit information associated with the DCI message to identify a first carrier includes identifying the carrier explicitly indicated in the DCI message. In some cases, prior to receiving the DCI message, the first uplink sub-frame was used by the HPG to transmit the data packet to an access device via a second carrier different from the first carrier. In some cases each of the HPGs is indexed to a different carrier and wherein the step of identifying one of the HPGs includes identifying the HPG indexed to the DCI message carrier.

In some embodiments the DCI message includes an HPG Index (HPGI) field, an HPGI is included in the HPGI field that explicitly indicates the HPG and wherein the step of using at least one of explicit and implicit information associated with the DCI message to identify one of the HPGs includes using the HPGI to identify one of the HPGs. In some embodiments the HPGs are indexed to specific carriers, the DCI message is received via a carrier and wherein the step of using at least one of explicit information and implicit information associated with the DCI message to identify one of the HPGs includes using the DCI message carrier to identify an HPG.

In some embodiments the DCI message includes explicit information indicating a carrier and wherein the step of using at least one of explicit information and implicit information associated with the DCI message to identify a first carrier includes identifying the carrier explicitly indicated in the DCI message.

Other embodiments include a user agent for use in a wireless communication system, the user agent comprising a processor programmed to perform the steps of transmitting a data packet via a uplink sub-frame and a first carrier to an access device, receiving a DCI message transmitted from an access device that is associated with the uplink sub-frame and the first carrier and that one of implicitly and explicitly indicates a second carrier and retransmitting the data packet via the uplink sub-frame and the second carrier to the access device.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and more specifically, referring to FIG. 1, FIG. 1 is a schematic diagram illustrating a multi-channel communication system 30 including a user agent (UA) 10 and an access device 12. UA 10 includes, among other components, a processor 14 that runs one or more software programs wherein at least one of the programs communicates with access device 12 to receive data from, and to provide data to, access device 12. When data is transmitted from UA 10 to device 12, the data is referred to as uplink data and when data is transmitted from access device 12 to UA 10, the data is referred to as downlink data.

To facilitate communications, a plurality of different communication channels are established between access device 12 and UA 10. For the purposes of the present disclosure, referring to FIG. 1, the important channels between access device 12 and UA 10 include a Physical Downlink Control CHannel (PDCCH) 70, a Physical Uplink Shared CHannel (PUSCH) 72 and a Physical Hybrid automatic Repeat request Indicator CHannel (PHICH) 74. As the label implies, the PDCCH is a channel that allows access device 12 to control UA 10 during data communications. To this end, the PDCCH is used to transmit scheduling or control data packets referred to as downlink control information (DCI) packets to the UA 10 to, among other things, indicate resources to be used by UA 10 to transmit uplink communication traffic packets to the access device. The uplink specifying DCI format referred to as format 0 currently used in the E-UTRAN is described at section 5.3.3.1.1 of 3GPP TS 36.212 V8.3.0 (2008-05). Exemplary DCI format 0 packets are indicated by communications 71 and 75 on PDCCH 70 in FIG. 1. In FIG. 1, exemplary traffic data packets on PUSCH 72 are labeled 73 and 79.

Referring to FIG. 1, the PHICH 74 is used by access device 12 to transmit acknowledgement (ACK) and negative acknowledgement (NACK) signals (see 77 in FIG. 1) to UA 10 for each of the traffic packets received to indicate either correct or incorrect packet reception, respectively. Where a traffic packet is not received correctly and a NACK is transmitted back to UA 10, UA 10 retransmits the incorrectly received traffic packet (see packet 79 in FIG. 1) to access device 12.

Uplink communications in the LTE system are divided into eight sub-frames where a different data packet can be transmitted in each of the eight sub-frames. When access device 12 determines that UA 10 has a data packet to transmit to access device 12, the access device 12 identifies a currently unused sub-frame and transmits a DCI message to the UA 10 indicating the sub-frame to use for the transmission along with other resource grant information. The sub-frame to be used is implicit in the DCI message timing as a DCI message is associated with a sub-frame that lags the DCI message by four milliseconds in the LTE system. In at least some cases, a carrier to be used by UA 10 to transmit a sub-frame to access device 12 may be indicated by the carrier used to transmit the DCI message itself. Thus, where a DCI message is transmitted in a fourth of five frequencies, UA 10 may be programmed to use the fourth frequency to transmit the sub-frame.

Referring still to FIG. 1, UA processor 20 maintains a HARQ entity 22 in which data packets being transmitted to access device 12 are stored. HARQ entity 22 manages HARQ processes and, to that end, in at least some embodiments, maintains a plurality of HARQ Process Groups (HPGs) identified by numerals 24, 26, 28, 32 and 34. Each of the HPGs, as the label implies, is a group of HARQ processes that can be identified via an HGP Indicator (HPGI) which, in at least some embodiments, will include a three bit field. In at least some embodiments each HPG is indexed or directly associated with one of the system carriers. For instance, in FIG. 1 where there are five HPGs, each of the HPGs would be indexed with a specific carrier. In the interest of simplifying this explanation, unless indicated otherwise, it will be assumed that HPGs 24, 26, 28, 32 and 34 are indexed to or associated with carriers f1, f2, f3, f4 and f5, respectively. Each of the HPGs is capable of simultaneously performing eight HARQ processes, a separate process for each of the eight sub-frames in the uplink communication.

When a data packet is provided to HARQ entity 22 and UA processor 20 receives a DCI message granting an uplink resource, HARQ entity 22 provides the packet to a HARQ process indicated by the DCI message. For instance, in embodiments where each HPG is indexed to a carrier frequency, the packet will be provided to the HPG that is indexed to the frequency used by the access device to transmit the DCI message. In the present example, if a DCI message carrier is f4, the packet is provided to and stored in HPG 32 (e.g., HPG 32 is indexed to carrier f4).

In addition, each HPG associates received packets with the uplink sub-frame implicit in the timing of the DCI message. For instance, in the LTE system, DCI messages are associated with sub-frames that occur 4 milliseconds thereafter where sub-frames are one millisecond in duration. Thus, where a DCI message is received during a first sub-frame SF1, the message indicates resources for transmitting data in the fifth sub-frame SF5. Similar, where a DCI message is received during an eight sub-frame SF8, the message indicates resources for transmitting data in the fourth sub-frame SF4 (i.e., the sub-frames continuously loop from eighth back to first).

Each HPG manages HARQ transmissions of packets stored therein. Thus, for instance, where a DCI message inherently indicates carrier f4 and sub-frame SF5 for transmitting a packet, HPG 32 associated with carrier f4 transmits the packet via carrier f4 in sub-frame SF5. Where the packet is unsuccessfully received by an access device (i.e., a NACK is received by UA 10), HPG 32 retransmits the packet to the access device during the following sub-frame SF5. Which carrier is used by HPG 32 to retransmit the packet is controlled by DCI messages.

When an access device monitoring various LTE system operating parameters determines that a new carrier is not needed to retransmit a previously transmitted packet, the HPG simply uses the previous carrier to retransmit. For instance, in the above example where carrier f4 is used initially to transmit a packet, carrier f4 would again be used to retransmit the packet. Here, the access device does not have to generate a new DCI message as the resources previously used to transmit are simply used to retransmit.

When an access device monitoring various LTE system operating parameters determines that a new carrier should be used to retransmit a packet, in parallel with generating the NACK, the access device also generates a new DCI message to indicate a different uplink resource including a new or adaptive carrier. In at least some embodiments the new DCI message includes a three bit HPGI field used to indicate a specific one of the HPGs 24, 26, 28, 32 and 34 in FIG. 1. In addition, the new DCI is timed to indicate the sub-frame (e.g., SF5 in the above example) for which the carrier should be changed and is transmitted via the adaptive carrier to indicate the carrier that should be used by the HPG to retransmit the packet.

When HARQ entity 22 receives the new DCI message, entity 22 identifies the HPGI, the DCI message carrier (i.e., the new or adaptive carrier) and the sub-frame implicit in the DCI message timing and provides the adaptive carrier and sub-frame information to the HPG indicated by the HPGI. The HPG uses the sub-frame to identify the sub-frame for which the carrier is to be changed and then uses the adaptive carrier to retransmit the stored packet in the sub-frame to access device 12.

This process continues until either the packet is correctly received by access device 12 or until access device 12 transmits a DCI message to UA 10 where the NDI indicates that new data should be transmitted to access device 12 by the HPG via the sub-frame associated with the packet.

Figure 2:
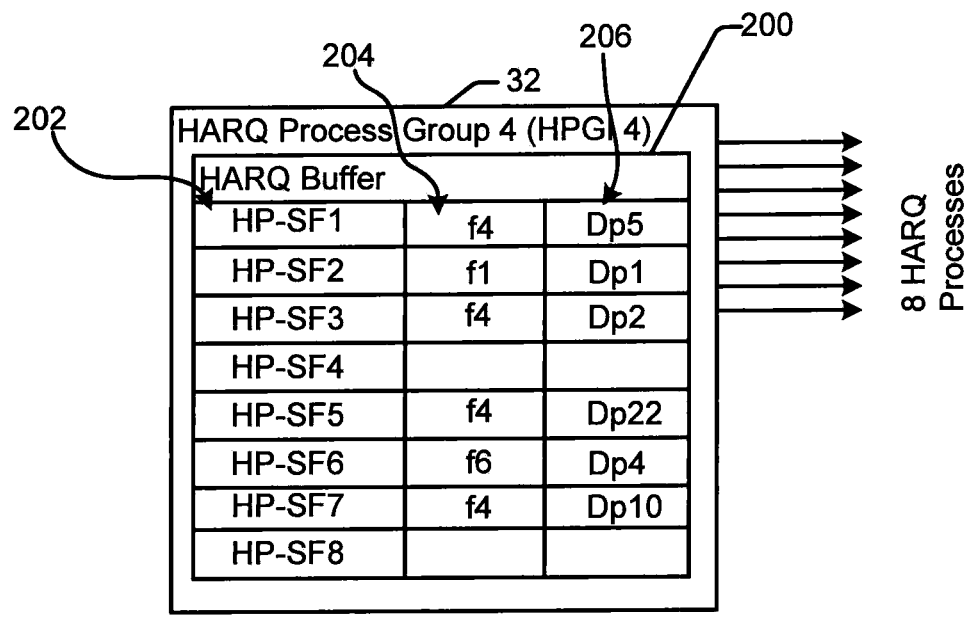
FIG. 2 is a schematic illustrating a HARQ buffer associated with one of the HARQ process groups in FIG. 1.

Refer now to FIG. 2, an exemplary HARQ Process Buffer 200 that may be maintained by HPG 32 in FIG. 1 as illustrated. Buffer 200 is shown in a simplified format in order to simplify this explanation. Here, however, it should be recognized that the buffer 200 may be far more complex and may take any of several forms. Exemplary simplified buffer 200 includes three columns including a HARQ process column 202, a frequency column 204 and a data packet column 206. The HARQ process column 202 lists an identifier for each of the eight different HARQ processes that may be simultaneously performed by HPG 32. Here, the eight HARQ processes correspond to the eight separate sub-frames SF1, SF2, SF3 . . . SF8 in an uplink communication, respectively. Carrier column 204 lists a current frequency used or to be used by HPG 32 for retransmitting data packets associated with the sub-frame indicated in column 202. For example, for the HARQ process HP-SF1, column 204 indicates that carrier f4 is to be used for packet re-transmission while, for HARQ process HP-SF2, column 204 indicates that carrier f1 is to be used. Column 206 stores data packets currently associated with the sub-frames indicated in column 202. For example, data packets Dp5 and Dp1 are associated with sub-frames SF1 and SF2, respectively. Therefore, for instance, when data packet Dp5 is to be re-transmitted to an access device 12, that data packet is transmitted via carrier f4 and in sub-frame SF1. When the carrier associated with a data packet is adaptively changed, the new carrier is indicated in column 204. For instance, in the present example were HGP 32 is indexed to the fourth carrier f4, it should be appreciated that, in the illustrated state, carriers for sub-frames SF2 and SF6 have been adaptively modified. Although not illustrated, access device 12 would also maintain process buffers similar to the buffer in FIG. 2, albeit where the data packet column would include the latest compilations of the data obtained that correspond to a specific HARQ processes in the sub-frame column.

Figure 3:
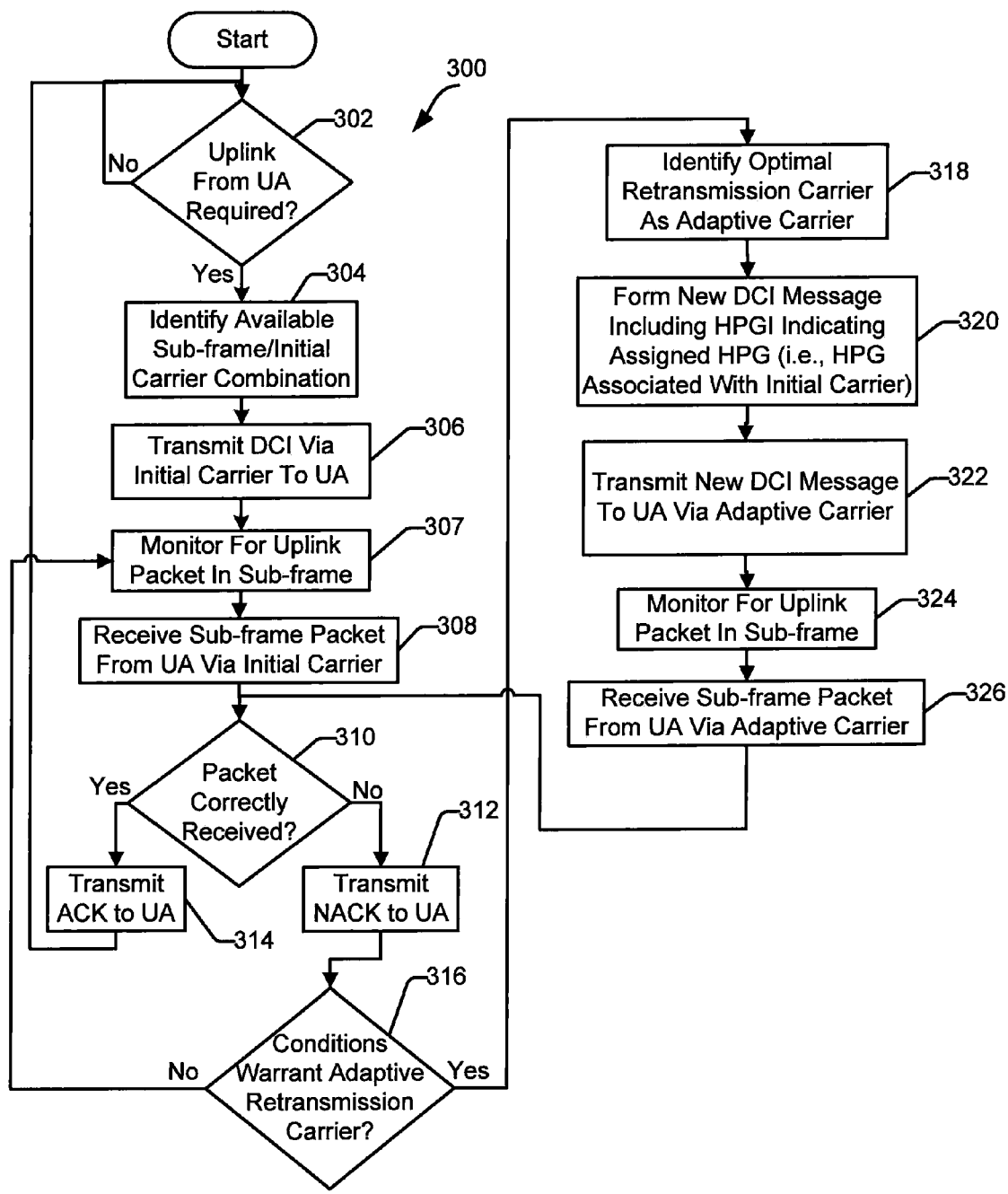
FIG. 3 is a flow chart illustrating a method that may be performed by the access device of FIG. 1 to facilitate adaptive retransmission by the user agent in FIG. 1 in a multi-carrier system.

Referencing now to FIG. 3, a sub-process performed by access device 12 in FIG. 1 for facilitating adaptive re-transmissions across system carriers by UA 10 is illustrated. At block 302, access device 12 determines whether or not an uplink from UA10 is required. When an uplink is required, at process block 304, access device 12 identifies an available sub-frame/initial carrier combination. At block 306, access device 12 transmits a DCI message (see 71 in FIG. 1) timed to indicate the available sub-frame and via the initial carrier to UA 10. At block 307, access device 12 monitors the PUSCH for an uplink communication (see 73 in FIG. 1) via the initial carrier during the sub-frame indicated via the DCI message timing. Once a sub-frame packet is received from UA 10 via the initial carrier, control passes to block 310.

Referring still to FIGS. 1 and 3, at decision block 310, access device 12 determines whether or not the packet was correctly received. When the packet is correctly received, control passes to block 314 were access device 12 transmits an ACK (see 77 in FIG. 1) to the UA 10 after which control passes back up to block 302 were the process described above continues.

Referring again to decision block 310, were a packet is incorrectly received, control passes to block 312 were access device 12 transmits a NACK (see 77 in FIG. 1) to UA 10. Continuing, at block 316, access device 12 determines whether or not conditions within the communication system warrant an adaptive or new retransmission carrier. Were conditions do not warrant an adaptive retransmission carrier, control passes back up to block 307 were access device 12 continues to monitor for re-transmitted packets via the initial carrier. At block 316, where conditions do warrant an adaptive re-transmission carrier, control passes to block 318 where access device 12 identifies an optimal re-transmission carrier as an adaptive carrier. At block 320, access device 12 forms a new DCI message including an HPGI in an HPGI field were the HPGI indicates the HPG that was associated with the initial carrier (e.g. the carrier identified at process block 304). For example, in the present case were the HPGs are indexed to specific carriers and the initial carrier at block 304 was carrier f4, the HPGI at block 320 would indicate the fourth HPG 32 illustrated in FIG. 2.

Referring yet again to FIGS. 1 and 3, at block 322, access device 12 transmits the new DCI message (see 75 in FIG. 1) to UA 10 via the adaptive carrier (i.e., via the new carrier to be used by UA 10 to transmit the packet). At block 324, access device 12 monitors the PUSCH 72 for a packet (see 79 in FIG. 1) retransmitted via the adaptive carrier during the sub-frame identified at block 304 and at block 326, when a sub-frame packet is received from the UA 10 via the adaptive carrier, control passes back to block 310 were access device 12 again determines whether or not the packet has been correctly received.

Figure 4:
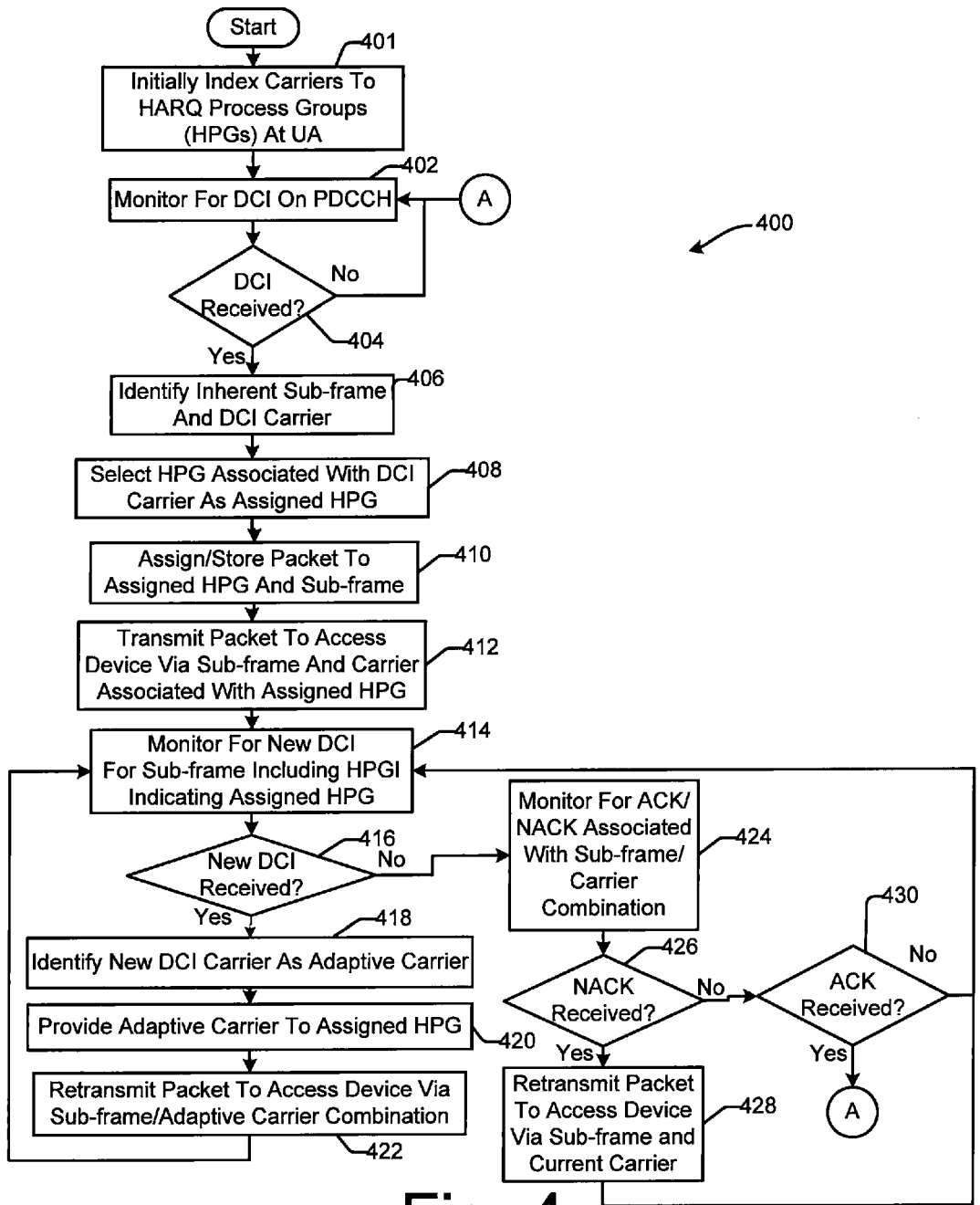
FIG. 4 is a flow chart illustrating a process that may be performed by the user agent of FIG. 1 to facilitate adaptive retransmission in a multi-carrier system.

Referring now to FIG. 4, a process 400 performed by UA 10 of FIG. 1 for managing adaptive re-transmissions in a multi-carrier system is illustrated. Portions of process 400 in FIG. 4 are performed in parallel with portions of the process 300 shown in FIG. 3 which are preformed by access device 12. Referring also to FIG. 1, at block 401, system carriers are initially indexed to specific HPGs within the UA 10. For instance, consistent with the description above, carriers f1, f2, f3, f4 and f5 may be indexed with HPGs 24, 26, 28, 32 and 34, respectively. At block 402, UA processor 20 monitors PDCCH 70 for DCI messages (see 71 in FIG. 1). At block 404, when a DCI message is received from access device 12, control passed to block 406 where processor 20 identifies the implicit sub-frame indicated by the DCI message timing as well as the carrier used to transmit the DCI message. At block 408, processor 20 selects the HPG indexed to the carrier used to transmit the DCI message as an assigned HPG. At block 410, processor 20 assigns a data packet to the assigned HPG and the sub-frame identified at block 406. Referring also to FIG. 2, here we assumed that the DCI message indicated sub-frame SF5 and was transmitted via frequency f4 so that the assigned HPG is HPG 32. In FIG. 2, the exemplary packet is identified as Dp22.

Referring still to FIGS. 1 and 4, at block 412, HPG 32 transmits packet Dp22 (see 73 in FIG. 1) to access device 12 via sub-frame SF5 and carrier f4. At block 414, processor 20 monitors PDCCH 70 for a new DCI message indicating the sub-frame and including HPGI indicating the assigned HPG. At block 416, where a new DCI message having the characteristics of block 414 is not received, control passes to block 424 where processor 20 monitors PHICH for an ACK/NACK associated with the sub-frame SF5 on carrier F4. At block 426, were a NACK is not received, control passes to block 430 where processor 20 determines whether or not an ACK is received. Where an ACK is not received, control passes back up to block 414 were the process described above continues. At block 430, were an ACK is received, control passes back up to block 402 were the process described above continues.

Referring again to block 426, when a NACK is received, control passes to block 428 where HPG 32 retransmits packet DP 22 to access device 12 via sub-frame SF5 via the current carrier f4. After block 428, control passes back up to block 414.

Referring once again to block 416, if a new DCI message (see 75 in FIG. 1) is received at block 416 where the message has the characteristics indicated in block 414, control passes to block 418. At process block 418, processor 20 identifies the carrier used to transmit the new DCI message as an adaptive carrier. At block 420, processor 20 provides the adaptive carrier and a sub-frame indication to the assigned HPG 32 and at block 422 HPG 32 retransmits packet Dp22 to access device 12 via sub-frame SF5 using the adaptive carrier. For example, where the adaptive carrier is carrier f3, packet Dp22 is retransmitted via carrier f3. After block 422, control passes back from the block 414 where monitoring for new DCI as well as ACK and NACK indications continues.

Figure 5:
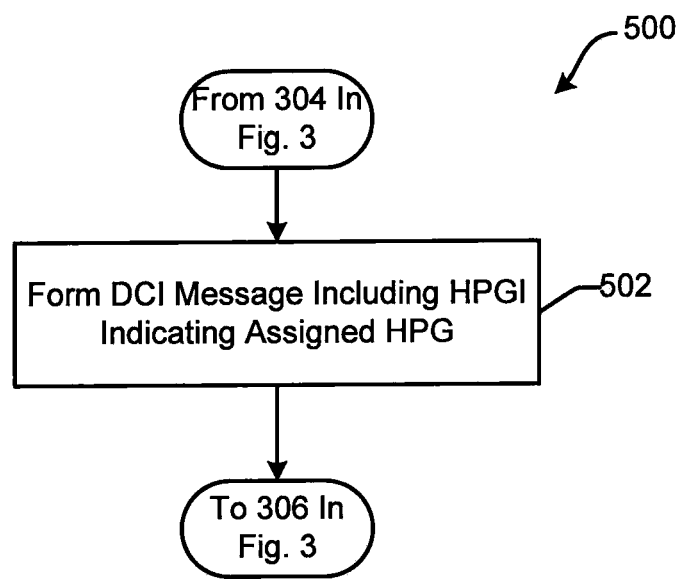
FIG. 5 is a flow chart illustrating a sub-process that may be substituted for a portion of the process shown in FIG. 3.

While the system described above is described as having HPGs that are indexed to specific carriers, in other embodiments it is contemplated that the HPGs may not be indexed to specific carriers. In this case, instead of relying on an initial DCI message carrier to implicitly indicate an HPG, the HPG assigned by an access device 12 for a particular packet will be indicated via an HPGI field. Where the initial HPG is indicated via a DCI message field, processes described above with respect to FIGS. 3 and 4 will be slightly modified. To this end, referring to FIG. 5, a sub-process 500 that may be substituted for a portion of the process 300 shown in FIG. 3 is illustrated. In FIG. 3, after block 304, control may pass to block 502 in FIG. 5 where a DCI message is formed that includes an HPGI indicating an assigned HPG. After block 502, control passes back to block 306 in FIG. 3 where the process described above continues.

Figure 6:
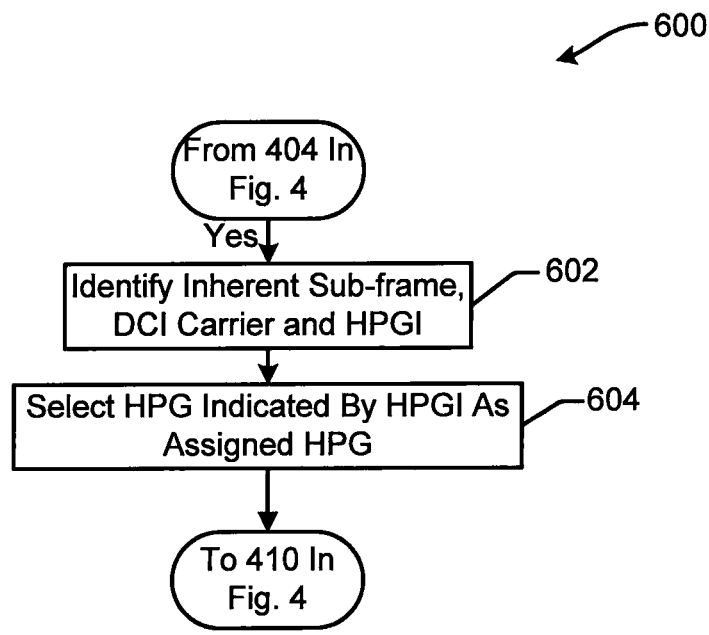
FIG. 6 is a flow chart illustrating a sub-process that may be substituted for a portion of the process shown in FIG. 4.

Referring to FIG. 6, a sub-process 600 that may be substituted for a portion of the process 400 shown in FIG. 4 as illustrated. In a process including the FIG. 6 sub-process, step 401 in FIG. 4 does not occur because the HPGs are not indexed to carriers. In FIG. 4, where a DCI message is received at block 404, control may pass to block 602 in FIG. 6. At block 602, UA processor 20 identifies the sub-frame in the DCI message timing, the DCI message carrier and the HPGI included in the DCI message. Here, the explicit HPGI indicates the specific HARQ process group to which the packet to be transmitted has been assigned by access device 12. Continuing, at block 604, processor 20 selects the HPG indicated by the HPGI to be the assigned HPG. After block 604, control passes back to block 210 in FIG. 4 and the process described above continues.

In some embodiments it is contemplated that a current/previously used carrier that was used to transmit a packet and an adaptive carrier may both by implied and/or explicit in a DCI message. For instance, in some cases a DCI message may include a current carrier field (e.g., 3 bits) instead of an HPGI field and the DCI message may be transmitted via an adaptive carrier. Here, UA 10 would be programmed to identify the current/previously used/initially used carrier in the current carrier field as well as identify the DCI message carrier as the adaptive carrier and to retransmit a data packet via the adaptive carrier as opposed to via the previously used carrier.

In other cases the DCI message may include an adaptive carrier field instead of an HPGI or current carrier field and the DCI message may be transmitted via the current/previously used/initially used carrier. Here, UA 10 would be programmed to identify the carrier in the adaptive carrier field as an adaptive carrier to be used for retransmission as well as identify the DCI message carrier as an indicator of the previously used carrier or initially used carrier, where the initially used carrier is the carrier used for the first HARQ transmission, to be changed to the adaptive carrier.

Figure 7:
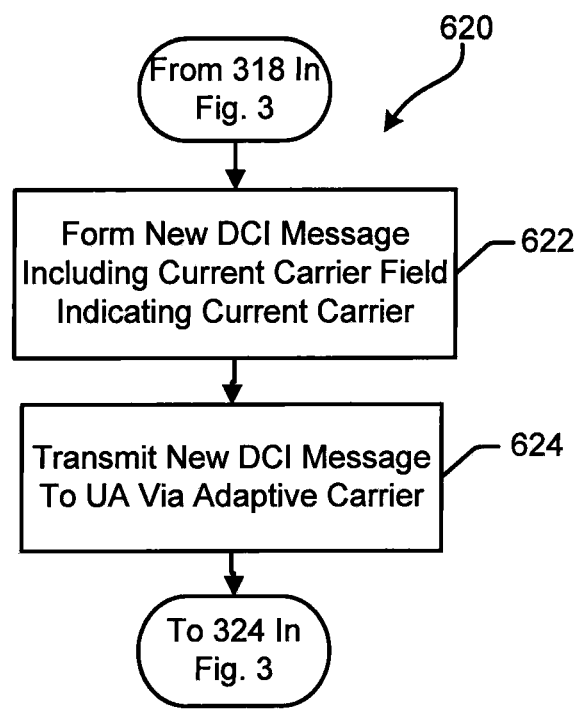
FIG. 7 is flow chart illustrating a sub-process that may be substituted for a portion of the process shown in FIG. 3 where a DCI message includes a current carrier field and an adaptive carrier field is implicit in a DCI message carrier.
Figure 8:
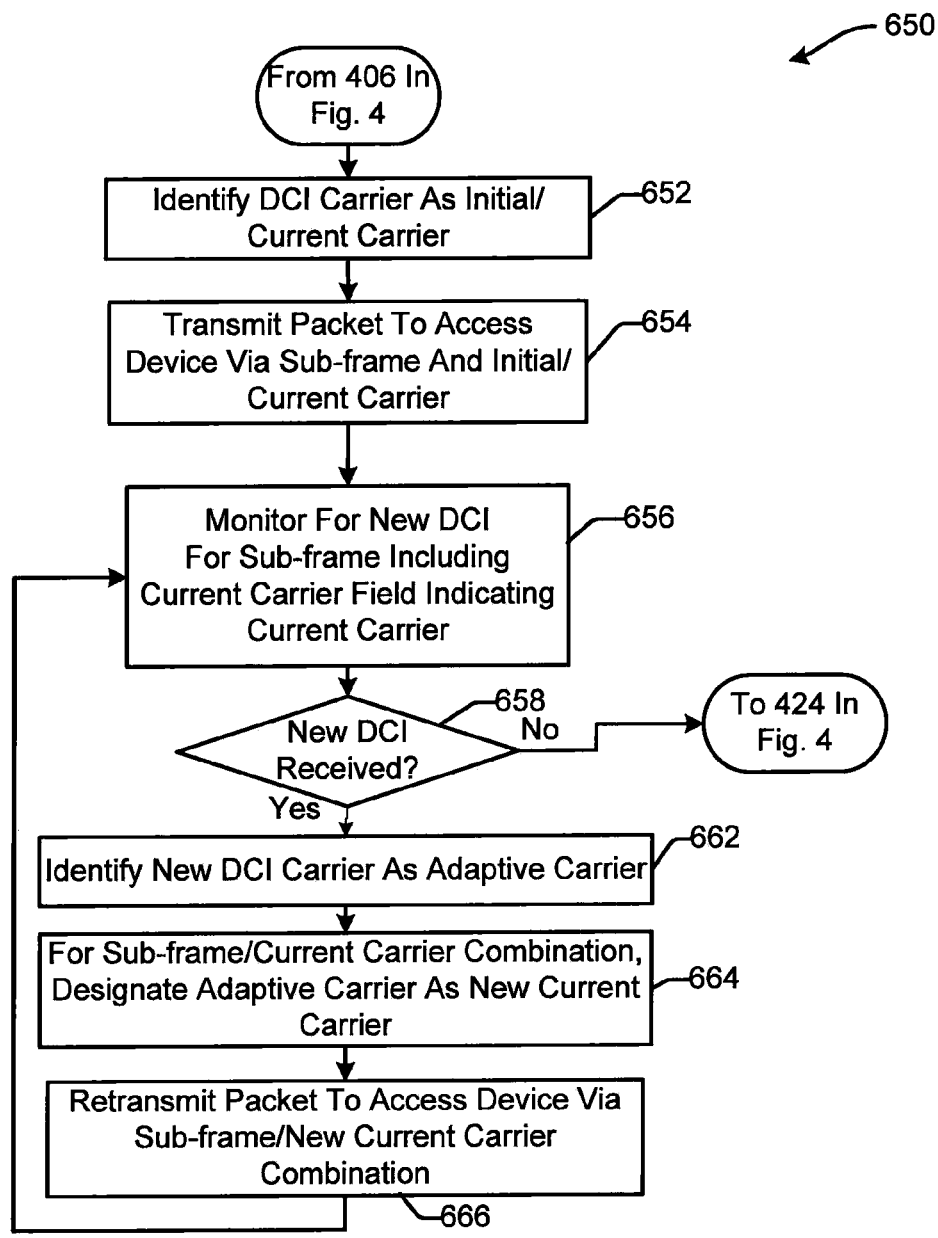
FIG. 8 is flow chart illustrating a sub-process that may be substituted for a portion of the process shown in FIG. 4 that compliments the sub-process shown in FIG. 7.

FIGS. 7 and 8 include sub-processes 620 and 650 that may be substituted for portions of FIGS. 3 and 4, respectively, where DCI the message includes a current carrier field and an adaptive carrier field is implicit in the DCI message carriers. Referring also to FIGS. 1 and 3, after block 318, access device control may pass to block 622 in FIG. 7 where access device 12 forms a new DCI message including a current carrier field (e.g., 3 bit) indicating a current carrier. At block 624, access device 12 transmits the new DCI message to UA 10 via the adaptive carrier. Next, control passes back to block 324 in FIG. 3.

Referring now to FIGS. 1, 4 and 8, after block 406 in FIG. 4, UA processor 20 control may pass to block 652 in FIG. 8. At block 652, processor 20 identifies the DCI message carrier as an initial/current carrier. At block 64, processor 20 transmits a data packet to access device 12 via the sub-frame (see again block 406 in FIG. 4) and the initial/current carrier. At block 656, processor 20 monitors the PDCCH for a new DCI message for the sub-frame including a current carrier field that indicates the current carrier (i.e., the carrier used to transmit at block 654).

Continuing, referring still to FIGS. 1 and 4, at process block 658, processor 20 determines whether or not a new DCI message having the characteristics specified by block 656 has been received. Where a new DCI message has not been received, control passes to block 424 in FIG. 4 where the process described above continues. Once a new DCI message having the characteristics specified by block 656 is received, control passes to block 662 where processor 20 identifies the new DCI message carrier as an adaptive carrier. At block 664, processor 20 designates the adaptive carrier as the new current carrier for the sub-frame and at block 666 processor 20 retransmits the data packet to access device 12 via the sub-frame/new current carrier (i.e., the adaptive carrier) combination after which control passes back up to block 656 where the process described above continues.

Figure 9:
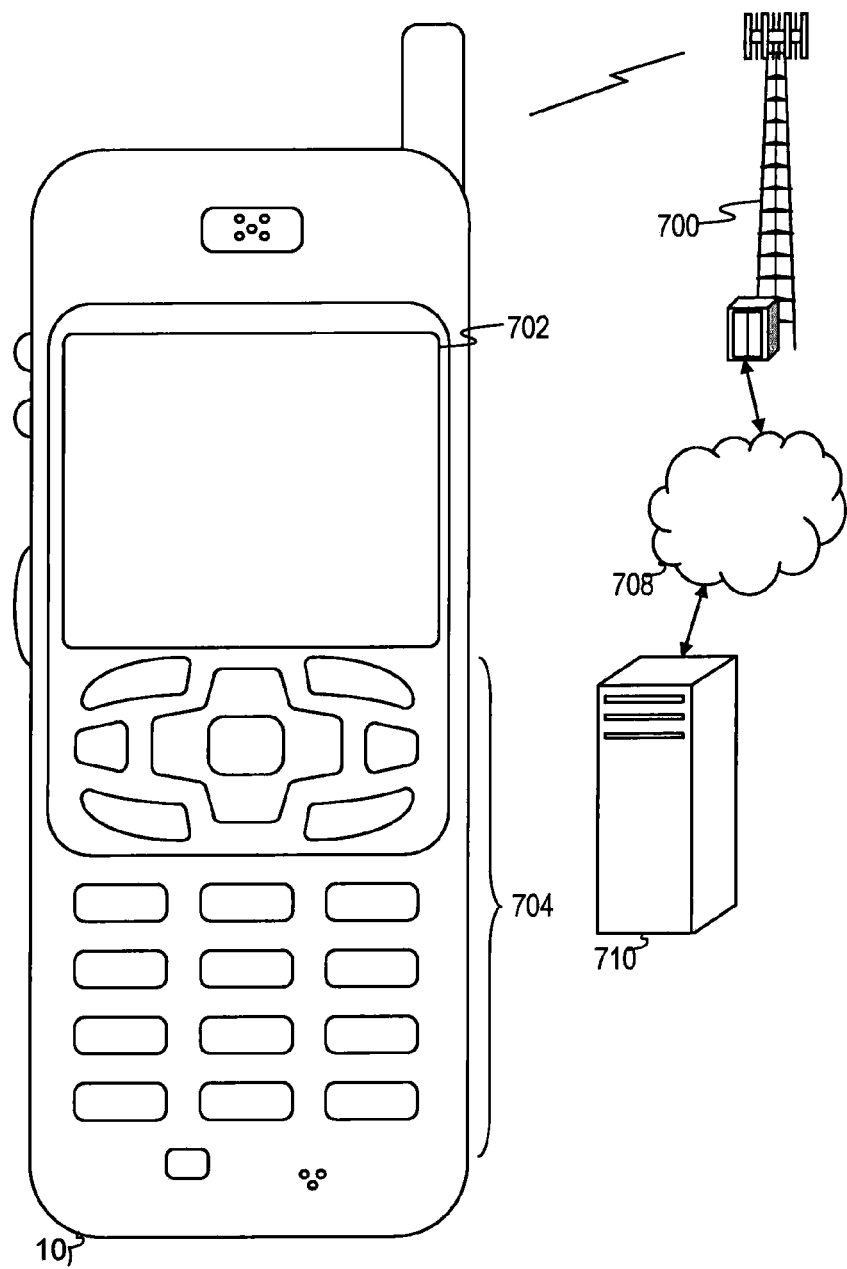
FIG. 9 is a diagram of a wireless communications system including a user agent operable for some of the various embodiments of the disclosure.

FIG. 9 illustrates a wireless communications system including an embodiment of the UA 10. The UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 10:
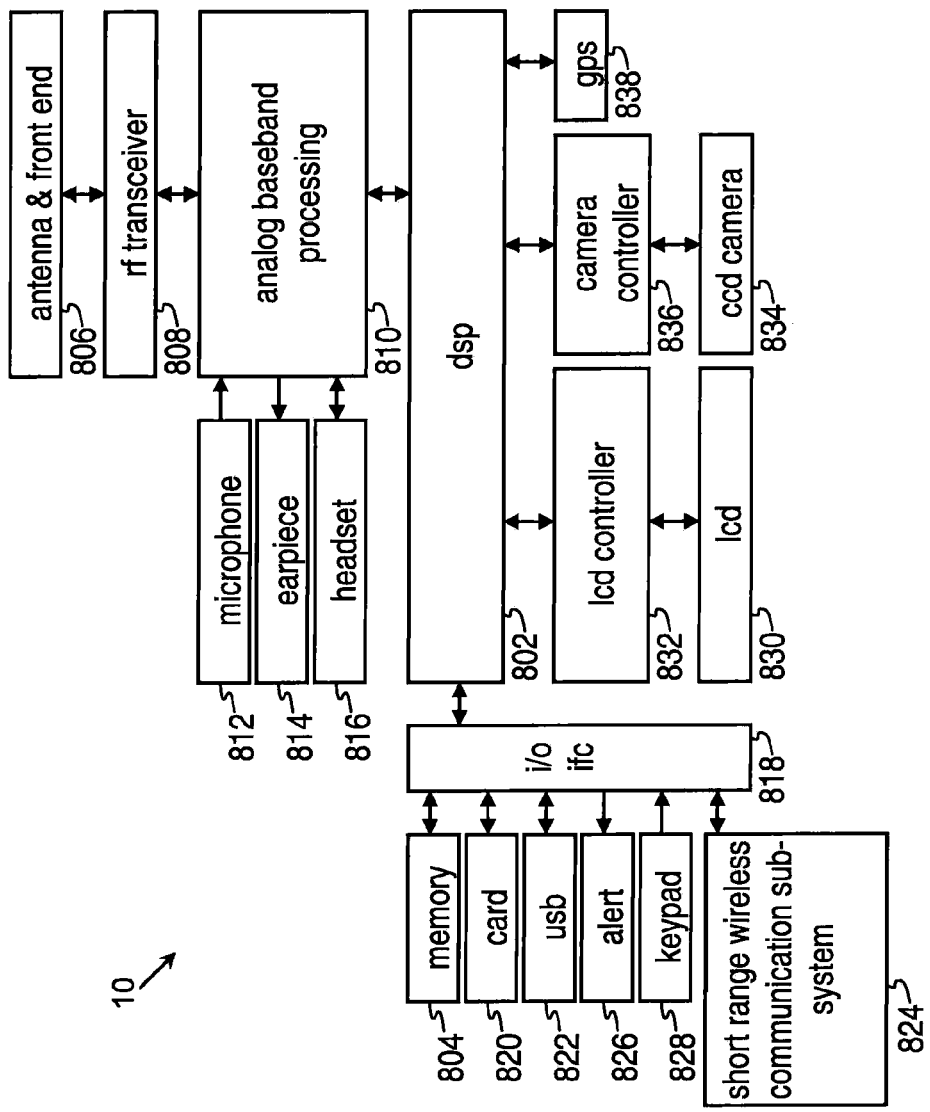
FIG. 10 is a block diagram of a user agent operable for some of the various embodiments of the disclosure.

FIG. 10 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific preassigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 11:
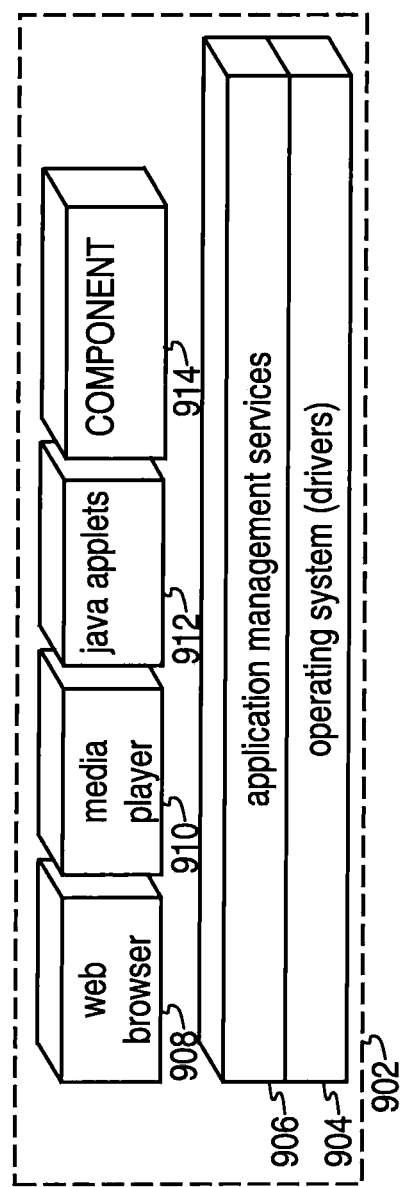
FIG. 11 is a diagram of a software environment that may be implemented on a user agent operable for some of the various embodiments of the disclosure.

FIG. 11 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 10 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audiovisual media. The Java applets 912 configure the UA 10 to provide games, utilities, and other functionality. A component 914 might provide functionality described herein.

Figure 12:
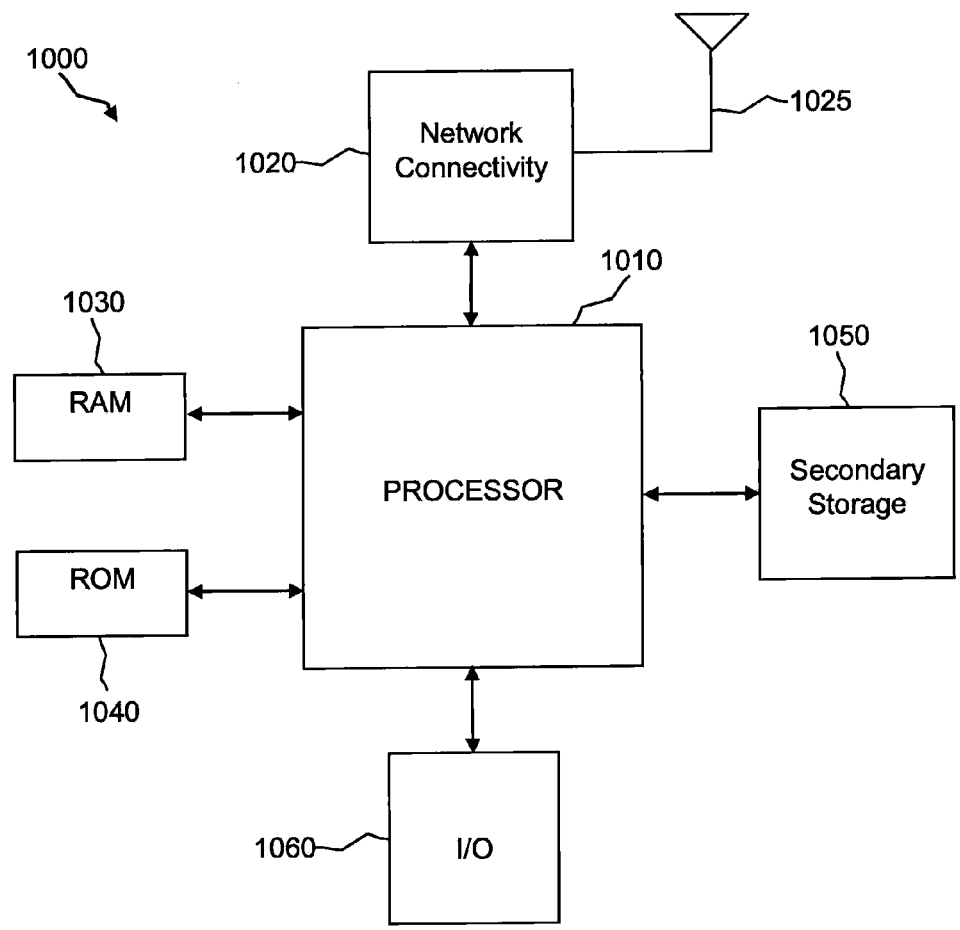
FIG. 12 is an illustrative general purpose computer system suitable for some of the various embodiments of the disclosure.

The UA 10, access device 120, and other components described above might include a processing component that is capable of executing instructions related to the actions described above. FIG. 12 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA)

devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, and TS 36.300.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

In addition, while the above embodiments rely on a DCI message carrier to indicate an adaptive carrier, other embodiments are contemplated where the adaptive carrier may also be explicitly indicated in an adaptive carrier field in the DCI message. Thus, here, in at least some embodiments, a DCI message would include both an adaptive carrier field and an HPGI field. In other embodiments where HPGs are indexed to specific carriers, a DCI message carrier may be used to implicitly indicate an HPG and the DCI format may only include an adaptive carrier field (and not include an HPGI field).

Moreover, in at least some embodiments a single current-to-adaptive carrier field may be provided that includes information that can be used to identify both a current carrier and an adaptive carrier. For instance, where a system includes four carriers f1, f2, f3 and f4, there are only twelve distinct current-to-adaptive carrier changes that can occur (e.g., f1-f2, f1-f3, f1-f4, f2-f1, f2-f3, f2-f4, f3-f1, f3-f2, f3-f4, f4-f1, f4-f2, f4-f3). These twelve possible carrier changes could be codified via a four bit (e.g., 16 possibilities) current-to-adaptive carrier field and UA 10) could be programmed to decode the carrier field bits to identify which of the twelve possible carrier changes is required and hence to identify a current frequency and an adaptive frequency. Here, both the current and adaptive frequencies would be explicit.

What is claimed is:

1. A method comprising:
   maintaining at least first and second Hybrid Automatic Repeat reQuest (HARQ) Process Groups (HPGs), wherein a combination of one of the at least first and second HPGs and a sub-frame number uniquely identifies a transmission stream and wherein the HPGs are indexed to specific carriers;
   receiving a downlink control information (DCI) message via a carrier;
   using a first information associated with the DCI message to identify one of the HPGs;
   using a second information associated with the DCI message to identify a first carrier;
   generating a transmission of at least one data packet using the identified HPG to an access device via the carrier and a first uplink sub-frame;
   monitoring a Physical Hybrid automatic repeat request Indicator CHannel (PHICH) for HARQ feedback related to the at least one data packet;
   wherein the first information comprises the DCI message carrier.

2. The method of claim 1 wherein the DCI message includes explicit information indicating an HPG and wherein the first information comprises the explicit information indicating an HPG.

3. The method of claim 2 wherein the DCI message is received via a carrier and wherein the second information comprises the DCI message carrier.

4. The method of claim 2 wherein the DCI message includes explicit information indicating a first carrier and wherein the second information comprises the explicit information indicating a first carrier.

5. The method of claim 1 wherein, prior to receiving the DCI message, the first uplink sub-frame was used by the HPG to transmit the data packet to an access device via a second carrier different from the first carrier.

6. The method of claim 2 wherein each of the HPGs is indexed to a different carrier and wherein the step of identifying one of the HPGs includes identifying the HPG indexed to the DCI message carrier.

7. The method of claim 2 wherein the DCI message includes an HPG Index (HPGI) field, an HPGI is included in the HPGI field that explicitly indicates the HPG and wherein the first information comprises the HPGI.

8. The method of claim 1 wherein the DCI message includes explicit information indicating a carrier and wherein the second information comprises the carrier explicitly indicated in the DCI message.

9. A method comprising:
transmitting a data packet via a uplink sub-frame and a first carrier to an access device;
if a DCI message transmitted from an access device is received in response to said transmitting, the DCI message being associated with the uplink sub-frame and the first carrier and that one of implicitly and explicitly indicates a second carrier, retransmitting the data packet via the uplink sub-frame and the second carrier to the access device;
otherwise, monitoring a Physical Hybrid automatic repeat request Indicator CHannel (PHICH) for HARQ feedback related to the data packet.

10. A user agent for use in a wireless communication system comprising:
a processor programmed to perform the steps of:
maintaining at least first and second Hybrid Automatic Repeat reQuest (HARQ) Process Groups (HPGs), wherein a combination of one of the at least first and second HPGs and a sub-frame number uniquely identifies a transmission stream and wherein the HPGs are indexed to specific carriers;
receiving a downlink control information (DCI) message from an access device via a carrier;
using a first information associated with the DCI message to identify one of the HPGs;
using a second information associated with the DCI message to identify a first carrier;
generating a transmission of at least one data packet using the identified HPG to an access device via the carrier and a first uplink sub-frame;
monitoring a Physical Hybrid automatic repeat request Indicator CHannel (PHICH) for HARQ feedback related to the at least one data packet;
wherein the first information comprises the DCI message carrier.

11. The user agent of claim 10 wherein the DCI message includes explicit information indicating a carrier and wherein the second information comprises the carrier explicitly indicated in the DCI message.

12. The user agent of claim 10 wherein the DCI message includes explicit information indicating an HPG and wherein the first information comprises the explicit information indicating an HPG.

13. The user agent of claim 12 wherein the DCI message is received via a carrier and wherein the second information comprises the DCI message carrier.

14. The user agent of claim 12 wherein the DCI message includes explicit information indicating a first carrier and wherein the second information comprises the carrier explicitly indicated in the DCI message.

15. The user agent of claim 10 wherein, prior to receiving the DCI message, the first uplink sub-frame was used by the HPG to transmit the data packet to an access device via a second carrier different from the first carrier.

16. The user agent of claim 12 wherein each of the HPGs is indexed to a different carrier and wherein the step of identifying one of the HPGs includes identifying the HPG indexed to the DCI message carrier.

17. The user agent of claim 12 wherein the DCI message includes an HPG Index (HPGI) field, an HPGI is included in the HPGI field that explicitly indicates the HPG and wherein the first information comprises the HPGI.

18. A user agent for use in a wireless communication system, the user agent comprising:
a processor programmed to perform the steps of:
transmitting a data packet via a uplink sub-frame and a first carrier to an access device;
if a DCI message transmitted from an access device is received in response to said transmitting, the DCI message being associated with the uplink sub-frame and the first carrier and that one of implicitly and explicitly indicates a second carrier, retransmitting the data packet via the uplink sub-frame and the second carrier to the access device;
otherwise, monitoring a Physical Hybrid automatic repeat request Indicator CHannel (PHICH) for HARQ feedback related to the data packet.

* * * * *

UNITED STATES PATENT AND TRADEMARK OFFICE
CERTIFICATE OF CORRECTION

PATENT NO. : 9,001,745 B2  
APPLICATION NO. : 12/723181  
DATED : April 7, 2015  
INVENTOR(S) : Sean Michael McBeath, Zhijun Cai and Yi Yu Page 1 of 1

It is certified that error appears in the above-identified patent and that said Letters Patent is hereby corrected as shown below:

On the title page, item (54) and in the specification, column 1, line 2 (Title), After "CARRIER" insert -- AGGREGATION --.

Signed and Sealed this  
Twenty-fourth Day of November, 2015

Michelle K. Lee  
*Director of the United States Patent and Trademark Office*